(12) United States Patent
Semenenko

(10) Patent No.: US 6,296,152 B1
(45) Date of Patent: Oct. 2, 2001

(54) MATERIAL HANDLING APPARATUS

(76) Inventor: Ivan Semenenko, Wolford Lodge Great Wolford Road, Moreton-in-Marsh Gloucestershire (GB)

( * ) Notice: Subject to any disclaimer, the term of this patent is extended or adjusted under 35 U.S.C. 154(b) by 0 days.

(21) Appl. No.: 09/533,177

(22) Filed: Mar. 22, 2000

(30) Foreign Application Priority Data

Mar. 24, 1999 (GB) .................................................. 9906659
Jul. 14, 1999 (GB) .................................................. 9916462

(51) Int. Cl.$^7$ ............................. B65D 83/00; B65D 3/00
(52) U.S. Cl. ..................... 222/199; 222/504; 222/507; 222/559; 222/564
(58) Field of Search .................................... 222/199, 461, 222/477, 507, 559, 52, 185.1, 504, 564; 251/63, 63.5, 61; 141/312, 346

(56) References Cited

U.S. PATENT DOCUMENTS 4,691,843 * 9/1987 Dunan .................................. 222/199
4,823,987 * 4/1989 Switall .................................. 222/63

FOREIGN PATENT DOCUMENTS 0645325  3/1995  (EP) .
 685371  1/1953  (GB) .
2151214  7/1985  (GB) .

* cited by examiner

Primary Examiner—Allan N. Shoap
Assistant Examiner—Patrick Buechner
(74) Attorney, Agent, or Firm—Young & Thompson

(57) ABSTRACT

The material handling apparatus is in the form of apparatus for controlling the discharge of flowable material from a store thereof and comprises a hollow support member, a through-flow device slidable within the hollow support member, a closure operating member movable upwardly together with the through-flow device for opening a closure device to allow material to flow from the store into the through-flow device and actuator means between the hollow support member and the through-flow device for moving the through-flow device and the closure operating member relative to the hollow support member.

28 Claims, 6 Drawing Sheets

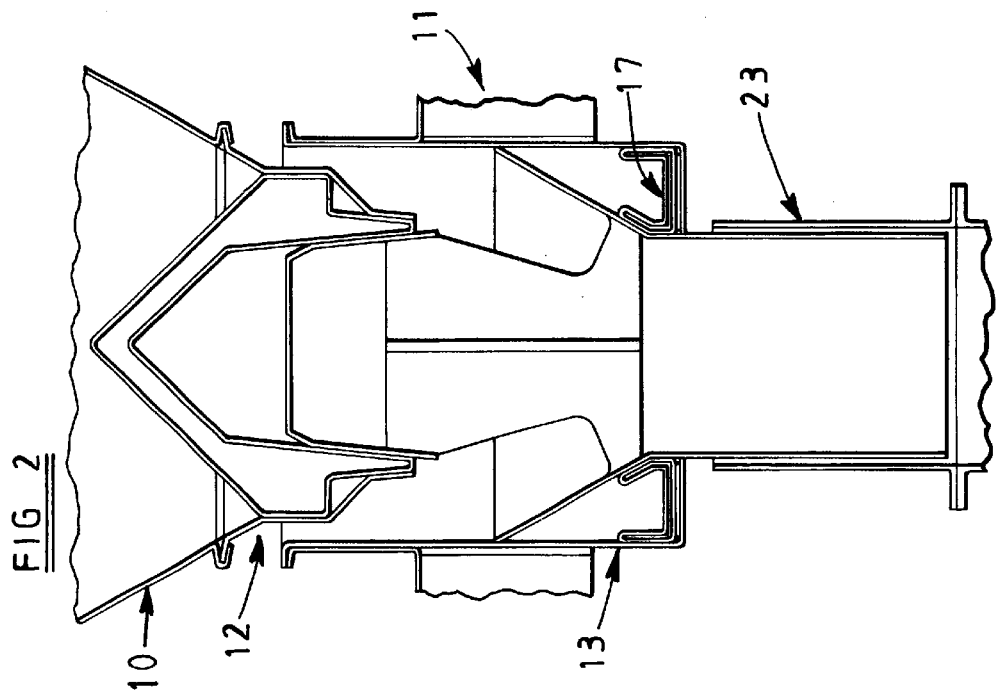
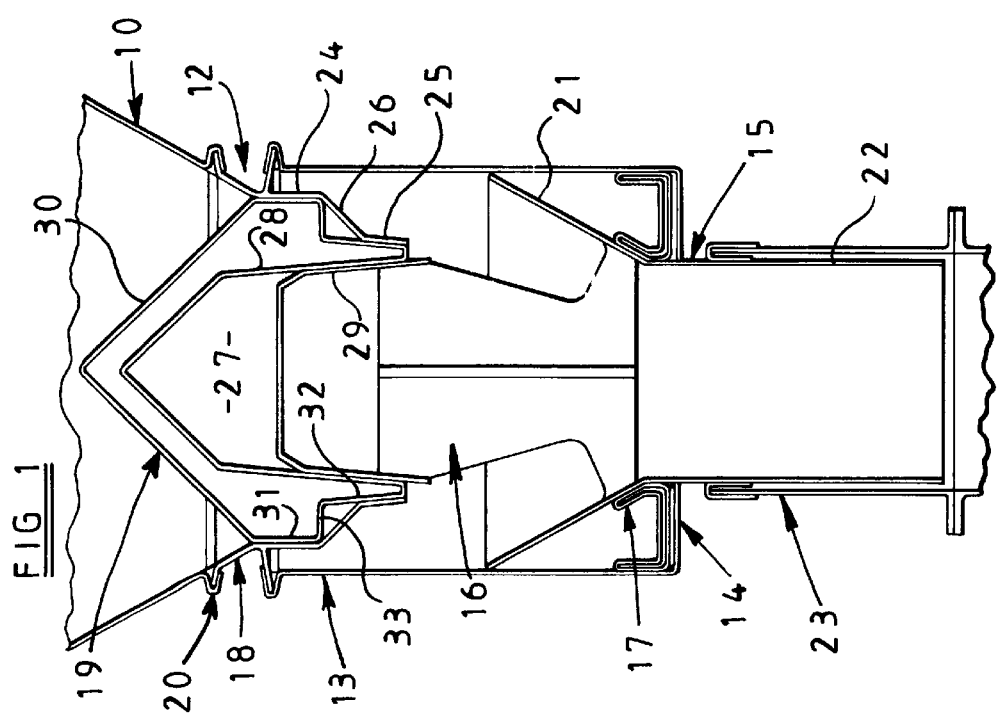

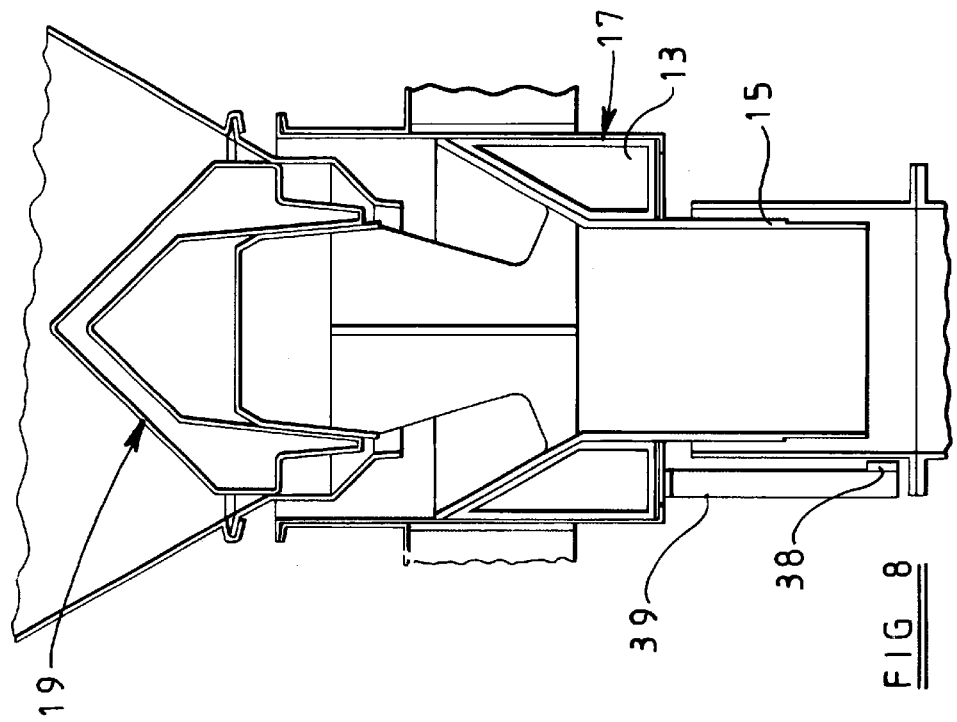
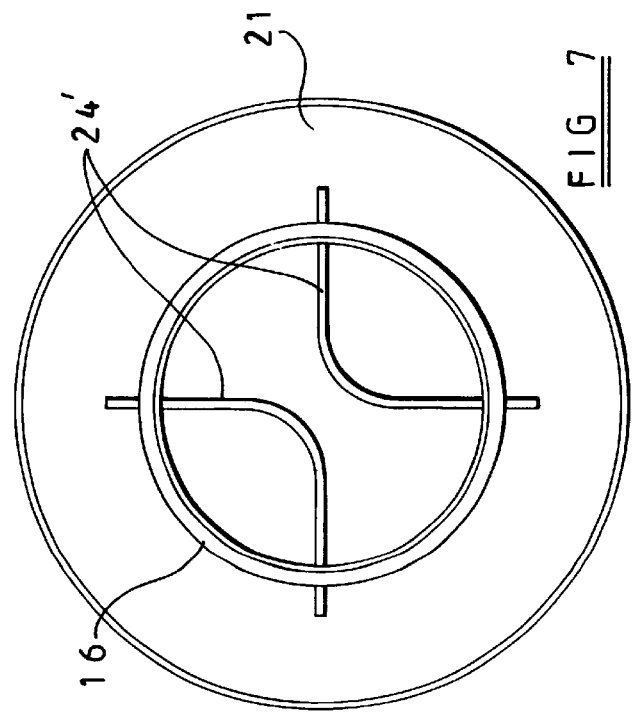

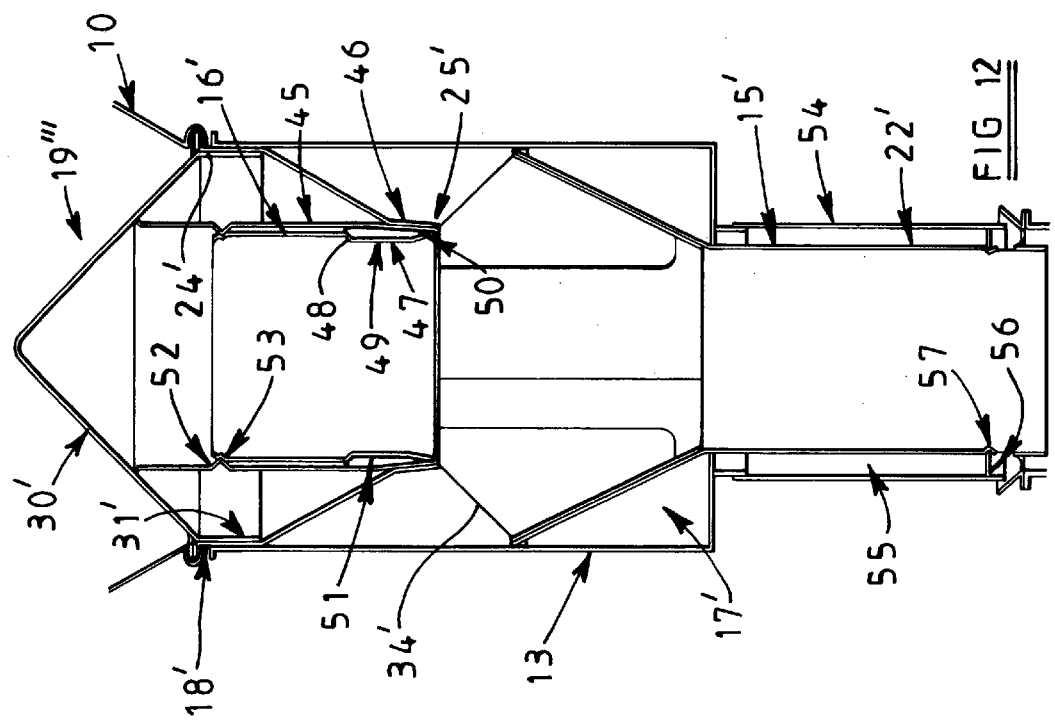
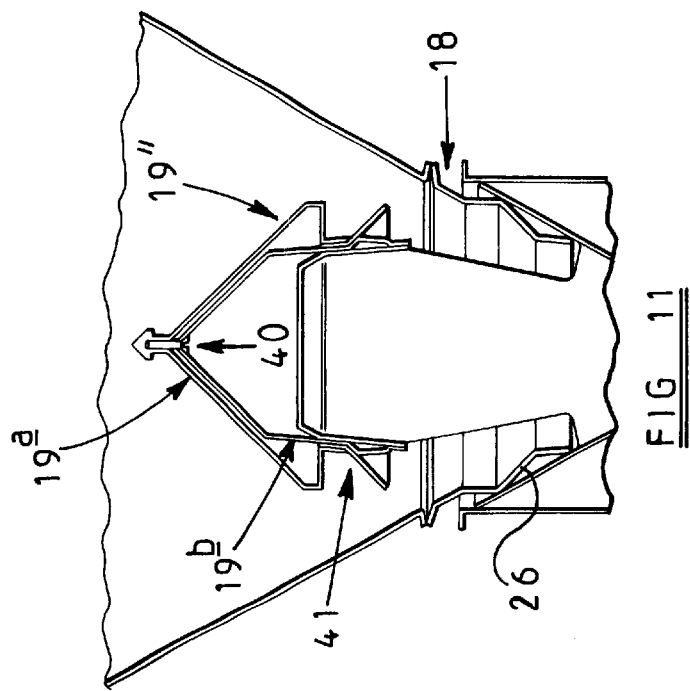

MATERIAL HANDLING APPARATUS

This invention relates to material handling apparatus and more particularly to apparatus for controlling the discharge of flowable material from a store thereof, such as a silo or an intermediate bulk container.

GB-A-2084969 discloses apparatus for controlling the discharge of flowable material from a store having a discharge opening near a lower end thereof. The apparatus comprises a closure device in the form of a cone valve mounted internally of the discharge opening, a pneumatic actuator in the form of a bellows device for moving the closure device vertically between a position in which the opening is fully closed and a position in which the opening is open for flow of material therethrough, and a vibrator adjacent to the closure device for vibrating the closure device to assist flow of material through the discharge opening. The apparatus also includes guide rods for guiding the closure device and adjustable and lockable bushes on the guide rods to limit the height of the lift to suit different powder characteristics and required flow rates. This type of apparatus is now in common use for controlling the discharge of flowable material such as powder or other particulate material.

It has become increasingly important in all processing industries that powders or other particulate materials used are contained within storage and processing vessels without contamination of the material, the outside environment or personnel and without cross contamination with other material or products. This is difficult to achieve with the aforementioned apparatus as all the working parts are within the process vessel and it has to be assembled with extreme care to ensure that nooks and crannies are minimised and there is no leakage through joints.

SUMMARY OF THE INVENTION

According to one aspect of the present invention there is provided apparatus for controlling the discharge of flowable material from a store thereof, comprising a hollow support member, a through-flow device slidable within the hollow support member, a closure operating member movable upwardly together with the through-flow device for opening a closure device to allow material to flow from the store into the through-flow device and actuator means between the hollow support member and the through-flow device for moving the through-flow device and the closure operating member relative to the hollow support member.

With such apparatus it is possible to avoid the use of mechanisms within the flow path of the material and it is, therefore, far easier to avoid contamination of the flowable material, the environment and personnel.

According to a second aspect of the invention there is provided apparatus for controlling the discharge of flowable material from a store thereof, comprising a closure device, means defining a discharge opening closable by the closure device, pneumatic actuator means for moving the closure device relative to the discharge opening defining means, means for operating the actuator means so as to move the closure device to a required position relative to the discharge opening defining means and means for pulsing the actuator means so as to oscillate the closure device about said set position.

The invention will now be more particularly described with reference to the accompanying drawings.

BRIEF DESCRIPTION OF THE DRAWINGS

FIG. 1 is a sectional view of one embodiment of apparatus according to the invention, fitted to a silo, FIG. 2 is a sectional view of a similar embodiment of apparatus according to the invention in combination with an intermediate bulk container, with an actuator deflated, FIG. 7 is a section taken along line A—A of FIG. 6, FIG. 8 is a sectional view of a further embodiment of apparatus according to the invention, FIG. 11 is a sectional view of the closure device shown in FIG. 10 in an open condition, and FIG. 12 is a sectional view of yet another embodiment of apparatus according to the invention.

DESCRIPTION OF THE PREFERRED EMBODIMENTS

FIG. 1 shows one embodiment of apparatus for controlling a discharge of flowable material from a container 10 in a form of a silo having a valve 12 at a lower end thereof.

Figure 4:
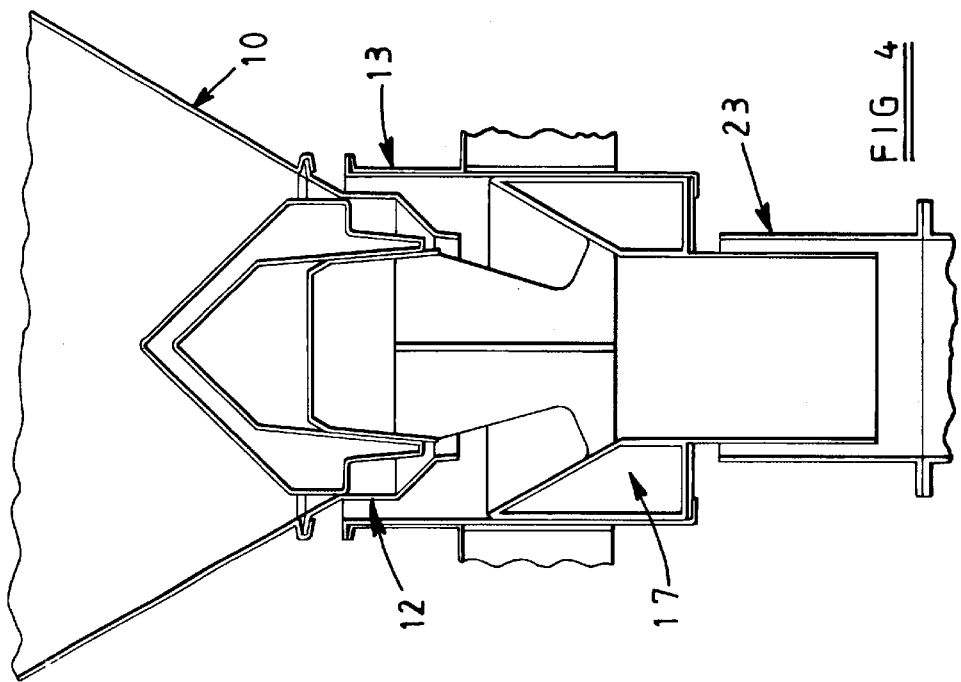
FIG. 4 is a view similar to FIG. 2, but with the actuator partially inflated.
Figure 3:
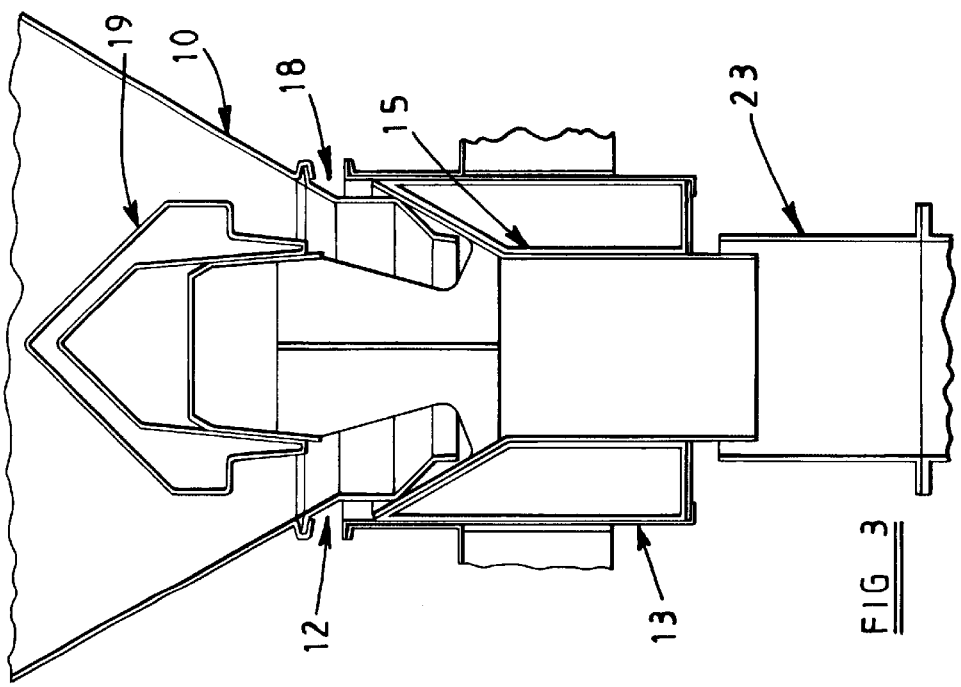
FIG. 3 is a view similar to FIG. 2, but showing the actuator fully inflated.

FIGS. 2 to 4 show apparatus similar to that shown in FIG. 1 but at a fixed discharge station 11 for receiving an intermediate bulk container (IBC) 10 having a valve 12 at a lower end thereof.

The apparatus comprises a hollow tubular support member 13 having an annular inwardly extending flange 14 at a lower end of the support member 13, a through-flow device 15, a closure operating member 16 and a pneumatic actuator 17 in a form of a flexible torroidal member similar to an inner tube of a vehicle tire.

The valve 12 comprises a discharge opening defining means in a form of a hopper 18 and a closure device 19. In the case of the silo shown in FIG. 1, the hollow support member 13 is attached to the hopper 18 by a band clamp 20.

The through-flow device 15 comprises an upper frusto-conical portion 21 and a lower cylindrical portion 22 which extends through an opening defined by the inner edge of the flange 14 and into a pipe 23. The upper edge of the frusto-conical portion 21 is a close sliding fit within the hollow tubular support member 13.

The closure operating member 16 is in a form of an upstanding probe secured to the frusto-conical portion 21 of the through-flow device 15 by angled rods 24' (as shown in FIG. 7).

The hopper 18 includes a first cylindrical portion 24 near to an upper end of the hopper 18, a second downwardly tapered frusto-conical portion 25 at a lower end of the hopper 18 and a third downwardly tapered frusto-conical portion 26 between the first and second portions 24 and 25. The frusto-conical portion 26 defines a greater angle with the vertical than the frusto-conical portion 25.

The closure device 19 is of double skinned, hollow construction. It is typically of plastics material or flexible steel. This will allow sufficient deformation of the closure device 19 to obtain good sealing contact with the hopper 18 thereby avoiding the need for a separate seal. The closure device 19 has a recess 27 in a lower surface thereof. The recess 27 has a frusto-conical wall 28 for receiving a frusto-conical portion 29 of the probe 16 as a tight fit. This ensures that the closure device 19 cannot tilt when the probe 16 is engaged with the closure device 19. It also forms a seal so that an underside of the closure device 19 and an upperside of the probe 16 remain dust free.

The closure device 19 has a conical upper surface 30, a cylindrical portion 31 depending from the outer edge of the upper surface 30, a frusto-conical portion 32 at a lower end of the closure device 19 and a substantially horizontal portion 33 between a lower end of the cylindrical portion 31 and an upper end of the frusto-conical portion 32. When the closure device 19 fully closes the discharge opening defined by the hopper 18, the frusto-conical portion 32 of the closure device 19 engages the frusto-conical portion 25 of the hopper 18 and the cylindrical portion 31 of the closure device 19 is disposed within the cylindrical portion 24 of the hopper 18 with a very small annular gap therebetween. As the closure device 19 moves from an open to a closed condition, the cylindrical portion 31 of the closure device 19 will co-operate with the cylindrical portion 24 of the hopper 18 (as shown in FIG. 4) to substantially close the discharge opening before the frusto-conical portions 25 and 32 come into engagement. This will allow material within the hopper 18 and below the horizontal portion 33 of the closure device 19 to fall away so that material is not trapped between the frusto-conical portions 32 and 25 when the closure device reaches a fully closed position. Material flowing through the discharge opening, when the closure device 19 is in an open condition, will pass through the through-flow device 15 and into the pipe 23.

The respective geometries of the hopper 18 and the closure device 19 created by the first and second portions 24 and 25 of the hopper 18 and the portions 31 and 32 of the closure device 19 also prevent the closure device 19 from tilting with respect to the hopper 18 when the closure device 19 closes the opening in the hopper 18. This is particularly advantageous when used as parts of intermediate bulk containers (IBCs) as it will prevent tilting when the IBCs are away from a fixed discharge station.

The actuator 17 being disposed between the through-flow device 15 and the hollow tubular support member 13 is not within the flow path of the material.

A pneumatic circuit is provided to inflate and deflate the torroidal actuator 17 in order to vary a position of the closure device 19 and thereby a size of the discharge opening between the closure device 19 and the hopper 18. The pneumatic circuit is also designed to pulse the torroidal actuator 17 so as to cause the closure device 19 to oscillate about a set position. This helps to break up consolidated powders and bridges within powders and separates the flowing powder out around the closure device 19 and through the annular discharge opening.

A frequency and amplitude of the oscillations can be varied according to a type of powder or other particulate material being discharged.

A load cell (not shown) could be used to sense a weight of material in a container to which material is discharged by the apparatus described above. A signal representative of the sensed weight could then be used to control a rate of discharge of the material.

Any one or more of the closure device 19, the hopper 18, the hollow tubular support member 13, the through-flow device 15 and the probe 16 can be molded in plastics material thereby making them hygienic, maintenance free and easy to clean.

Figure 6:
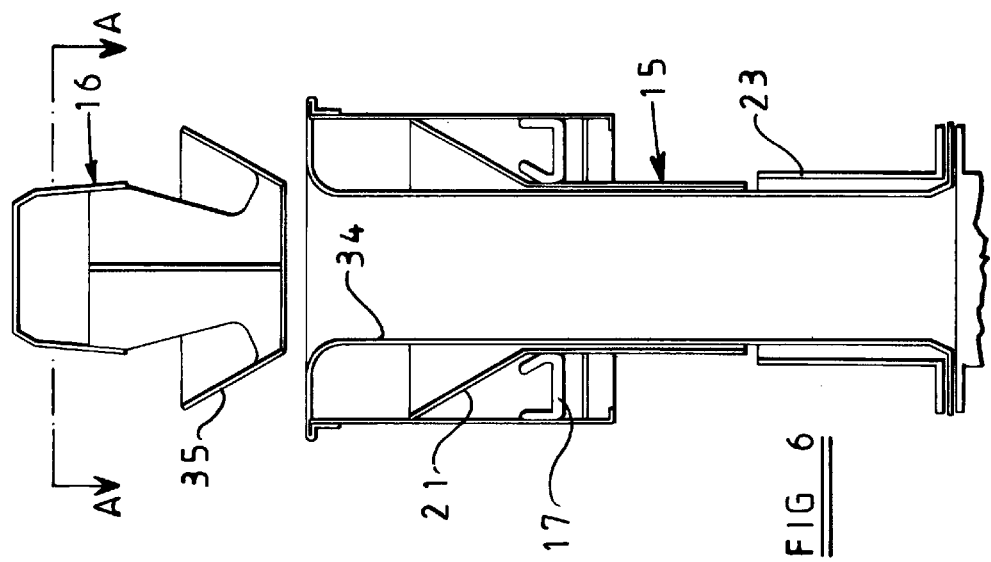
FIG. 6 is an exploded view of part of the apparatus shown in FIG. 5.
Figure 5:
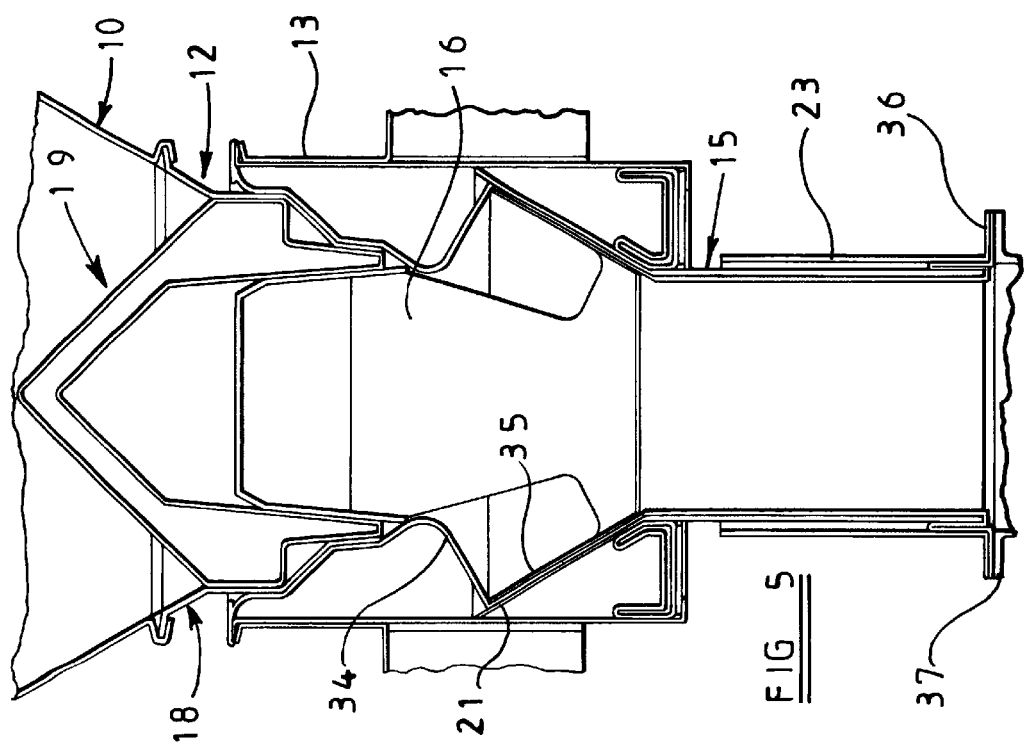
FIG. 5 is a sectional view of another embodiment of apparatus according to the invention.

As shown in FIGS. 5 and 6, a flexible tubular seal 34 of elastomeric material can be provided between a top of the hollow tubular support member 13 and a bottom of the pipe 23. In this case, the probe 16 is separate from the through-flow device 15 and the probe 16 includes its own frusto-conical portion 35 which sits in the frusto-conical portion 21 of the through-flow device 15. The seal 34 extends around an outer surface of the hopper 18 and passes between the frusto-conical portion 35 of the probe 16 and the frusto conical portion 21 of the through-flow device 15, through the through-flow device 15 and is trapped between a flange 36 at the bottom of the pipe 23 and a customer's process inlet flange 37. This ensures a completely smooth unbroken barrier between an interior and an exterior of the apparatus.

Alternatively, there could be separate seals between the top of the tubular support member 13 and the probe 16 or the hopper 18 and between the bottom of the tubular support member 13 and the pipe 23.

The apparatus can also be provided with one or more position sensors 38 (see FIG. 8). The position sensor or sensors 38 can be mounted on a rodless pneumatic cylinder 39 depending from the bottom of the hollow tubular support member 13 for sensing a bottom edge of the through-flow device 15. The position of the sensor(s) 38 can be varied by extending or retracting the cylinder 39. The closure device 19 can be oscillated about a required position either by the actuator 17 being exhausted and then quickly re-inflated as the sensor 38 senses the bottom edge of the through-flow device 15 or by the use of two sensors 38 at slightly different heights to create sequential exhaustion and re-flation of the actuator 17. The use of two sensors 38 would enable the closure device 19 to be oscillated between two fixed points at a fixed amplitude but at a variable frequency.

Figure 9:
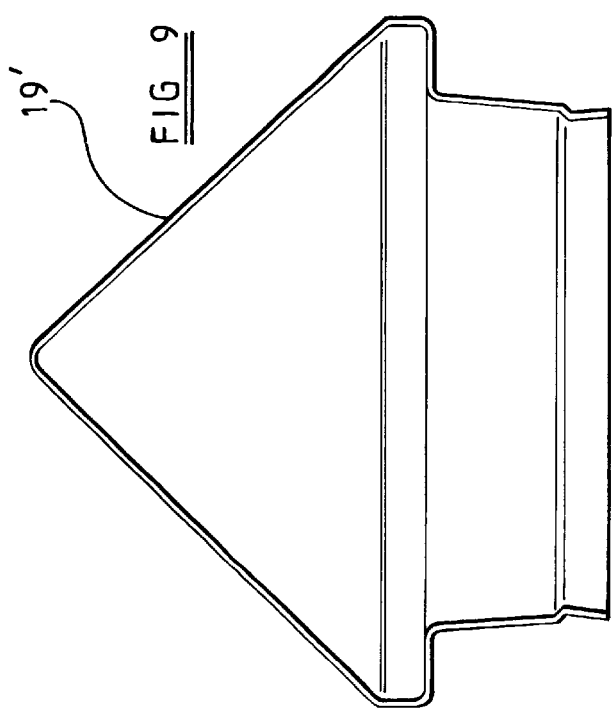
FIG. 9 is a sectional view of an alternative closure device.

FIG. 9 shows another embodiment of a closure device 19' which, in this case is in a form of a single skinned device.

Figure 10:
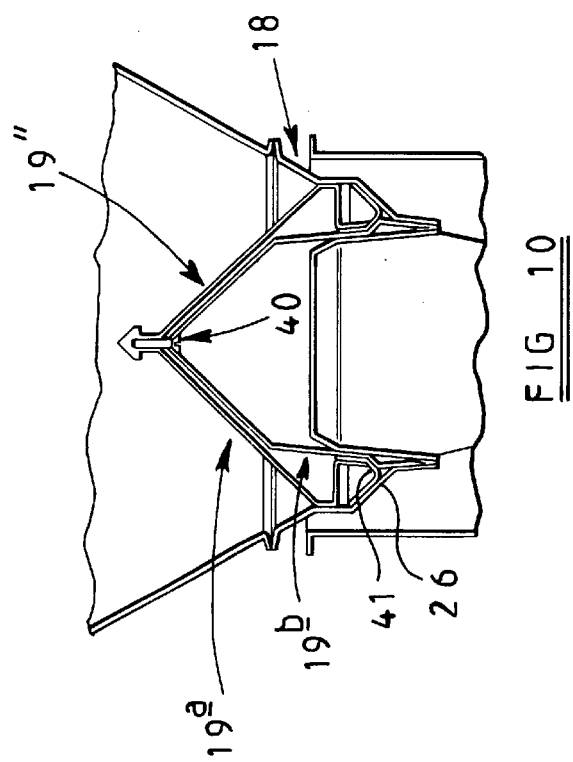
FIG. 10 is a sectional view of yet another closure device in a closed condition.

FIGS. 10 and 11 show another embodiment of a closure device 19". In this embodiment, the closure device 19" is formed in two parts 19a and 19b secured together by a screw 40. An annular flexible seal 41 of elastomeric material is trapped between the two parts 19a and 19b and disposed between the portions 31 and 32. The annular flexible seal 41 is arranged to engage the frusto-conical portion 26 of the hopper 18 as the closure device 19" reaches a closed position. Use of this seal 41 is particularly useful when discharging extremely free flowing powders or liquids and/or sensitive and easily damaged materials.

FIG. 12 shows another embodiment of apparatus for controlling the discharge of flowable material from a container, particularly an intermediate bulk container, and differs from the embodiment shown in FIGS. 5 to 7 in the following respects. Closure device 19''' has an upper conical portion 30', a cylindrical portion 31' depending from an outer edge of the upper portion 30' and an inner tubular portion 45 which is coaxial with the conical upper portion 30'. The inner tubular portion 45 has a frusto-conical portion 46 at its lower end which seats against frusto-conical portion 25' of hopper 18' when the discharge opening is closed. An annular gasket may be provided at the upper end of the cylindrical portion 24' of the hopper 18' to provide a wiping seal with the closure device 19'''.

Probe 16' has an annular recess 47 adjacent to a lower end thereof. The recess 47 is defined by a convergent upper wall 48, a slightly divergent base 49 and a more steeply divergent lower wall 50.

A pneumatic actuator in a form of a flexible torroidal member 51 is provided in the recess 47. This member 51 is a tight fit around the probe 16' when deflated and, therefore, when deflated, the actuator 51 is housed wholly within the recess 47 to allow the closure device 19''' to locate and lower onto, and off the probe 16' when the container is lowered onto and lifted off the discharge station. When the closure device 19''' is in position on the probe 16', a lower end of the tubular portion 45 seats and seals against wall 50 of the probe 16'. The actuator 51 can be inflated to clamp the closure device 19''' to the probe 16'. The actuator 51 is deflated by a quick release exhaust valve (not shown) which exhausts into a space between the probe 16' and the tubular portion 45 of the closure device 19''' to ensure that no product/dust is drawn up to contaminate the closure device 19''' in the short time before seal 34' seals against the outside of the probe 16' when the container 10 and closure device 19''' are lifted off.

The inner tubular portion 45 of the closure device 19''' has an inwardly directed circumferentially extending lip 52 which engages a seat portion 53 at an upper end of the probe 16' to prevent the closure device 19''' from tilting with respect to the probe 16'.

As also shown in FIG. 12, the hollow tubular support member 13 has a downwardly extending extension tube 54 at its lower end. This extension tube 54 surrounds lower cylindrical portion 22' of through-flow device 15'. A further flexible inflatable torroidal member 55 is provided in an annular space between the lower cylindrical portion 22' of the through-flow device 15' and the extension tube 54. A split ring 56 is supported in a circumferentially extending groove 57 at the lower end of the inner tubular portion 45 of the through-flow device 15' and, when inflated, the member 55 bears against this ring 56 to urge the through-flow device 15', together with the probe 16', downwards. This member 55 serves as an air spring to urge the through-flow device 15', together with the probe 16', downwards whenever actuator 17' is deflated. The member 55 will thus clamp the closure device 19''' into the container 10, when the actuator 17' is not inflated, to ensure a good seal. It will also ensure that the probe 16' is not lifted up together with the container 10. Also, when the actuator 17' is pulsed so as to cause the closure device 19''' to oscillate about a set position, the member 55 can be used to pull the closure device 19''' downwards in a positive manner to provide better control and promote better flow of material from the container 10.

One or more position sensors (not shown) similar to those described with reference to FIG. 8 can be used in conjunction with a pneumatic control system to control movement and oscillation of the closure device 19'''.

The embodiments described above are given by way of example only and various modifications will be apparent to persons skilled in the art without departing from the scope of the invention as defined by the appended claims. For example, many parts are described above as being of conical or frusto-conical shape. They could alternatively be of pyramidical or truncated pyramidical shape. By providing air tight seals between the hollow tubular support member 13 and the through flow device 15, it is envisaged that it may be possible to do away with the torroidal member 17 so that the pneumatic actuator is defined by the chamber between the hollow tubular support member 13 and the through flow device 15. Also, as described above, the closure device and probe are separate parts so that a transportable container can be removed complete with closure device leaving the probe in position at the station. This also makes it possible in a fixed silo application to remove the whole of the lower mechanism leaving just the closure device in place for ease of maintenance. However, the closure device could be an integral part of the probe particularly on small static silos.

What is claimed is:

1. Apparatus for controlling a discharge of flowable material from a store thereof, comprising a hollow support member, a through-flow device slidable within the hollow support member, a closure operating member movable upwardly together with the through-flow device for opening a closure device to allow material to flow from the store into the through-flow device and actuator means between the hollow support member and the through-flow device for moving the through-flow device and the closure operating member relative to the hollow support member.

2. Apparatus as claimed in claim 1, further comprising means for operating the actuator means so as to move the closure operating member to a set position and means for pulsing the actuator means so as to oscillate the closure operating member about said set position.

3. Apparatus as claimed in claim 1, wherein the through-flow device includes a downwardly tapered portion slidable within the hollow support member.

4. Apparatus as claimed in claim 1, wherein the actuator means is pneumatic actuator means.

5. Apparatus as claimed in claim 4, wherein the pneumatic actuator means comprises an inflatable/deflatable torroidal element.

6. Apparatus as claimed in claim 1, further comprising one or more sensors for sensing a position of the closure operating member relative to the hollow support member.

7. Apparatus as claimed in claim 6, further comprising means for varying a position of at least one of the sensors.

8. Apparatus as claimed in claim 1, wherein an inflatable/deflatable torroidal clamping element is mounted on the closure operating member for clamping the closure operating member to the closure device when inflated.

9. Apparatus as claimed in claim 8, wherein means are provided for exhausting the torroidal clamping element via a space between the closure operating member and the closure device.

10. Apparatus as claimed in claim 1, wherein the through-flow device includes a tubular portion extending outwardly of the hollow support member for discharging material from the apparatus.

11. Apparatus as claimed in claim 10, wherein the hollow support member is provided with a tubular extension surrounding the tubular portion of the through-flow device and wherein means are provided between the tubular portion of the through-flow device and the tubular extension for urging the through-flow device and closure operating member towards a position in which, in use, the closure device is in a closed position.

12. Apparatus as claimed in claim 11, wherein the urging means comprises an inflatable torroidal element.

13. Apparatus as claimed in claim 1, further comprising means defining a discharge opening closable by the closure device.

14. Apparatus as claimed in claim 13, further comprising a flexible tubular seal between the through-flow device and the discharge opening defining means.

15. Apparatus as claimed in claim 13, wherein an upper surface of the closure device is of conical or pyramidical shape.

16. Apparatus as claimed in claim 13, wherein the closure device is double skinned.

17. Apparatus as claimed in claim 13, wherein the closure device has a recess in its lower surface for receiving part of the closure operating member.

18. Apparatus as claimed in claim 13, wherein the closure device and the discharge opening defining means have respective first portions for substantially closing the discharge opening as the closure device approaches but is spaced form a fully closed position and respective second portions which are engageable with one another to fully close the discharge opening when the closure device is in its fully closed position.

19. Apparatus as claimed in claim 18, further comprising an annular flexible seal between the first and second portions of the closure device.

20. Apparatus as claimed in claim 18, wherein the respective first portions are cylindrical and wherein the respective second portions are downwardly tapered.

21. Apparatus as claimed in claim 20, wherein the discharge opening defining means has a third portion intermediate its first and second portions, the third portion being downwardly tapered at a larger angle to the vertical than the second portion.

22. Apparatus for controlling a discharge of flowable material from a store thereof, comprising:

a closure device;

a through-flow device movable with said closure device;

means defining a discharge opening closable by the closure device;

pneumatic actuator means for moving the closure device relative to the discharge opening defining means;

means for operating the actuator means so as to move the closure device to a set position relative to the discharge opening defining means; and means for pulsing the actuator means so as to oscillate the closure device about said set position.

23. Apparatus as claimed in claim 22, further comprising one or more sensors for sensing a position of the closure device relative to the discharge opening defining means.

24. Apparatus as claimed in claim 23, further comprising means for varying a position of at least one of the sensors.

25. Apparatus for controlling a discharge of a flowable material from a removable store thereof, comprising:

a hollow support member;

a through-flow device slidable within the hollow support member;

a closure operating member movable upwardly together with the through-flow device for opening a closure device to allow material to flow from the removable store into the through-flow device; and actuator means between the hollow support member and the through-flow device for moving the through-flow device and the closure operating member relative to the hollow support member.

26. Apparatus for controlling a discharge of flowable material from a store thereof, comprising:

a hollow support member;

a through-flow device slidable within the hollow support member;

a closure operating member movable upwardly together with the through-flow device for opening a closure device to allow material to flow from the store into the through-flow device;

means defining a discharge opening closable by the closure device, the closure device and said means defining a discharge opening having respective first portions for substantially closing the discharge opening as the closure device approaches but is spaced from a fully closed position and respective second portions which are engageable with one another to fully close the discharge opening when the closure device is in its fully closed position; and actuator means between the hollow support member and the through-flow device for moving the through-flow device and the closure operating member relative to the hollow support member.

27. Apparatus for controlling a discharge of flowable material from a store thereof, comprising:

a closure device;

means defining a discharge opening closable by the closure device;

an inflatable/deflatable torroidal element for moving the closure device relative to the discharge opening defining means;

means for operating the torroidal element so as to move the closure device to a set position relative to the discharge opening defining means; and means for pulsing the torroidal element so as to oscillate the closure device about said set position.

28. Apparatus for controlling a discharge of flowable material from a store thereof, comprising:

a hollow support member;

a through-flow device slidable within the hollow support member;

a closure operating member movable upwardly together with the through-flow device for opening a closure device to allow material to flow form the store into the through-flow device;

actuator means between the hollow support member and the through-flow device for moving the through-flow device and the closure operating member relative to the hollow support member; and means for urging the through-flow device and closure operating member towards a position in which, in use, the closure device is in a closed position.

* * * * *